*(12)* United States Patent
Morphy

(10) Patent No.: US 7,103,394 B2
(45) Date of Patent: Sep. 5, 2006

(54) MOTORCYCLE AUDIO SYSTEM CONTROL DEVICE AND METHOD

(76) Inventor: William F. Morphy, 90 Fawnvue Dr., McKees Rocks, PA (US) 15136

( * ) Notice: Subject to any disclaimer, the term of this patent is extended or adjusted under 35 U.S.C. 154(b) by 474 days.

(21) Appl. No.: 10/352,666

(22) Filed: Jan. 28, 2003

(65) Prior Publication Data

US 2004/0147273 A1 Jul. 29, 2004

(51) Int. Cl.
*H04M 1/00* (2006.01)
*H04B 1/38* (2006.01)
(52) U.S. Cl. ............... 455/569.1; 455/90.2; 455/575.1
(58) Field of Classification Search ............... 455/90.2, 455/90.1, 550.1, 575.1, 571, 127.5, 569.1, 455/100, 99; 340/945
See application file for complete search history.

(56) References Cited

U.S. PATENT DOCUMENTS 4,754,486 A * 6/1988 Stafford et al. ............... 381/86
4,941,187 A 7/1990 Slater
5,748,101 A 5/1998 Christensen
5,881,370 A * 3/1999 Pottala et al. ............... 455/78
6,147,597 A 11/2000 Facory
6,160,496 A * 12/2000 Scheuer ............... 340/945
6,225,581 B1 5/2001 Gerbert-Gaillard et al.
6,311,052 B1 10/2001 Lenz
6,493,450 B1 * 12/2002 Scheuer et al. ............... 381/57
6,505,057 B1 * 1/2003 Finn et al. ............... 455/569.2
6,950,635 B1 * 9/2005 Miyamaru et al. ......... 455/90.3
2003/0028382 A1 * 2/2003 Chambers et al. ............ 704/275

* cited by examiner

*Primary Examiner*—Tilahun Gesesse
(74) *Attorney, Agent, or Firm*—Gaca Matis Baum & Rizza

(57) ABSTRACT

A motorcycle audio system is provided with circuitry to toggle the helmet mounted microphone of both the driver and the passenger on and off by use of the PTT (push to talk) switches commonly provided for use with a CB radio. Activation of a PTT immediately causes both microphones "on" regardless of their prior state. If the PTT is released during a predetermined short period, the microphones are turned off only if they were on prior to activation of the PTT and remain on only if they were off prior to activation. If the PTT is released after the predetermined period, the microphones remain on only if they were on prior to activation.

20 Claims, 4 Drawing Sheets

MOTORCYCLE AUDIO SYSTEM CONTROL DEVICE AND METHOD

BACKGROUND OF THE INVENTION

This invention relates to the control of intercom systems for motorcycles and other vehicles.

Intercoms allowing the driver and a passenger of a motorcycle to communicate with each other by means of speakers and microphones mounted in their helmets are well known. It is also well known to use the same speakers and microphones to allow the driver and the passenger to communicate with others by means of a CB radio, and/or to utilize the speakers to allow them to listen to entertainment audio which may be selected from audiotape players, CD players, MP 3 players and AM/FM radio. An example of the controls for such a multifunction audio system is described in U.S. Pat. No. 6,225,584. Voice actuated (VOX) circuits such as those described in U.S. Pat. No. 4,754,486 are often included in such multifunction audio systems to reduce or eliminate the entertainment signal to the speakers when one of the microphones or the CB receiver is actuated.

When using a multifunction system of the type described above, it will often be considered inconvenient to have the intercom on only when communication is desired. However, leaving the intercom in the "on" state can result in the undesired transmission of sounds originating from one of the users or from the environment. Such undesired transmissions can be annoying in themselves and may also degrade the entertainment audio by undesired activation of the VOX circuitry. Safety is a concern if the intercom volume control is used to eliminate undesired transmissions, since this requires the driver to remove a hand from the handlebars to access the volume control, which is usually located in the center tank area of the motorcycle. This can result in the driver having one hand removed from the handlebars for a significant amount of time.

SUMMARY OF THE INVENTION

Because a multifunction audio system for a motorcycle may include a CB radio, the controls for such a system usually include PTT (push to talk) switches conveniently located for activation by the driver and the passenger. The present invention provides means for switching the helmet mounted microphones of both the driver and the passenger both on and off by use of one of the PTTs. Regardless of their prior state ("on" or "off"), activation of a PTT immediately causes both microphones to be "on." If the PTT is released during a predetermined short period of time (for example, 0.5 sec), the microphones are turned "off" if they were "on" before activation of the PTT and remain "on" if they were "off" prior to the activation of the PTT. If the PTT is released after the predetermined period of time, the microphones remain on only if they were "on" before activation. The intercom can thus be activated and deactivated by short activation of the conveniently located PTTs. This permits the driver and the passenger to conveniently communicate with each other, while avoiding undesired transmissions over the intercom when communication is not desired. Since this is accomplished by activation of the PTTs that the users are accustomed to using for CB communication, the present invention avoids having to locate another communication control switch in the limited space available on a motorcycle and avoids requiring the user to decide upon and find the proper control for the desired type of communication. This enhances the safety of the operation of the motorcycle by eliminating or minimizing the time that the driver will not have both hands on the handle bars.

A motorcycle communication system equipped with the controller of the present invention will permit conventional push-to-talk operation of the intercom if the CB radio is turned off, or is not present.

DETAILED DESCRIPTION OF THE INVENTION

Figure 1:
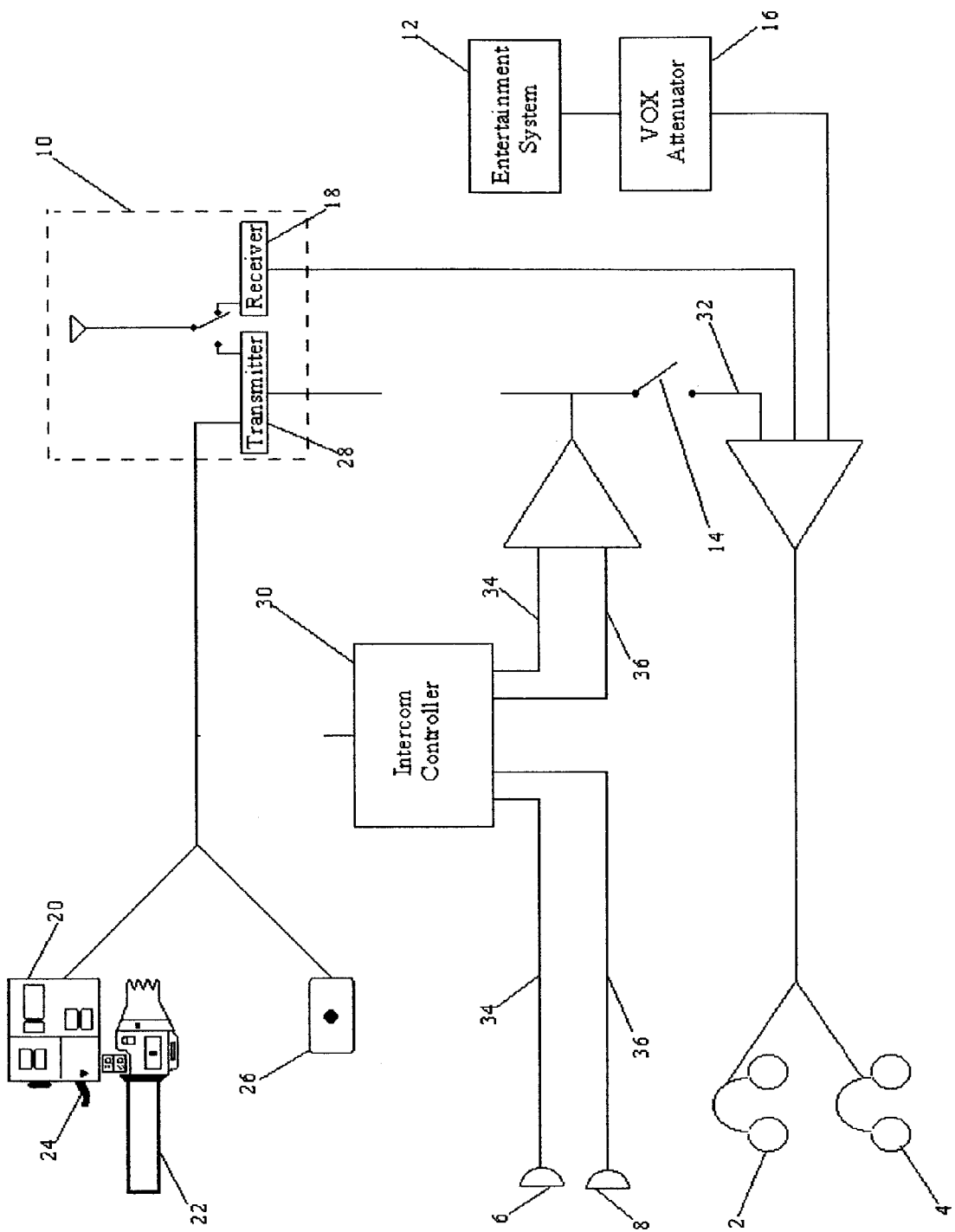
FIG. 1 is a functional block schematic of a multifunction audio system incorporating the present invention.

FIG. 1 illustrates a multifunction audio system for use by the driver and a passenger of a motorcycle which includes driver's helmet mounted speakers 2 and passenger's helmet mounted speakers 4, both of which are capable of accepting inputs from the driver's microphone 6, the passenger's microphone 8, the CB radio 10 and the entertainment system 12. The speakers 2 and 4 and microphones 6 and 8 are conventionally mounted in helmets worn by the driver and passenger respectively. Speakers mounted on the chassis of the motorcycle may, however, supplement or replace such helmet mounted speakers. The microphones 6 and 8 are connected to the speakers 2 and 4 by an intercom circuit 32 which can be activated and deactivated by means of a conventional switch 14. The entertainment system 12 may comprise an AM/FM radio, an audiotape player, a CD player, a MP3 player or any combination thereof. A VOX attenuator 16 is conventionally provided to reduce or eliminate the entertainment signal to the speakers 2 and 4 when either the CB receiver 18 or one of the microphones is activated.

An audio control 20 is conventionally mounted on a handlebar 22 of the motorcycle. The audio control 20 includes a driver's PTT 24 conventionally disposed close to the handlebar 22 so that it can be conveniently activated by the driver. A passenger's PTT 26 is also provided. Both the driver's PTT 24 and the passenger's PTT 26 are conventionally provided to activate the transmitter 28 of the CB radio 10.

The intercom controller 30 of the present invention is electrically connected to the driver's PTT 24 and the passenger's PTT 26 so as to be responsive to the activation of either PTT. The intercom controller 30 is also connected to the intercom circuit 32 so as to be capable of activating and deactivating that circuit. It has been found convenient to connect the intercom controller 30 to the portion of the intercom circuit 32 comprising the output cable 34 from the driver's microphone 6 and output cable 36 from the passenger's microphone 8. The intercom controller 30 may, however, be connected to the intercom circuit 32 at any point that would not interfere with signals to the speakers 2 and 4 from either the receiver 18 or the entertainment system 12. Unless overridden by the opening of switch 14, when either PTT 24 or PTT 26 is activated, intercom controller 30 operates to activate intercom circuit 32 if it was inactive prior to activation of the PTT and will have no immediate effect if the intercom circuit 32 was active prior to activation of the PTT. If the activated PTT is then released during a predetermined short period of time, the intercom controller 30 allows the intercom circuit 32 to remain active if, but only if, it was inactive prior to the activation of the PTT. If the activated PTT is released after said predetermined period, the intercom controller 30 permits the intercom circuit 32 to remain active only if it was active prior to the activation of the PTT. The intercom circuit 32 can thus be toggled between the active and inactive states by short activations of the PTTs 24 and 26 without interfering with the operation of the CB radio. To accomplish this objective, it has been found preferable to set said predetermined period of time at between 0.1 seconds and 0.75 seconds, approximately 0.5 seconds being best for most users. In some cases, however, it may be found desirable to set said predetermined delay for as long as 2 seconds.

Figure 2:
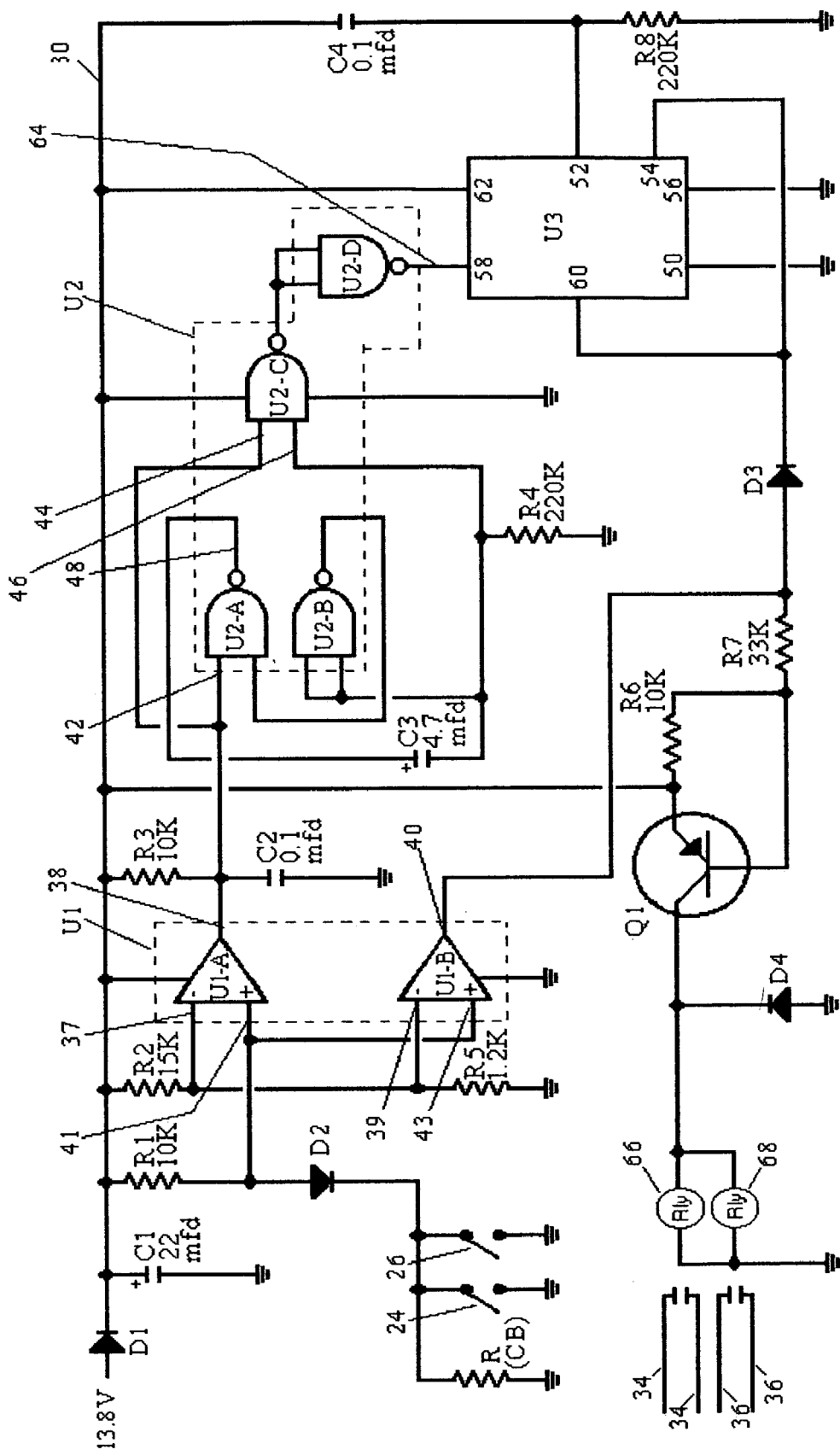
FIG. 2 is a schematic of one embodiment of the intercom control of FIG. 1.

FIG. 2 is a detailed schematic of one embodiment of the intercom controller 30. The controller 30 is powered by a motorcycle's conventional electrical system; an externally fused 13.8 volt DC source. This source voltage is applied to the controller 30 through series wired diode D1 and parallel wired capacitor C1 for the purpose of power supply filtering. This creates 13.2 volts for the controller 30 while diode D1 also provides reverse polarity protection. U1 is a LM339 quad comparator with two of it's comparator stages spared in this design. Both U1-A and U1-B are given the same inputs and therefore react to input changes concurrently. The negative input 37 of U1-A (pin 4) and the negative input 39 of U1-B (pin 10) are referenced with 0.97 volts via voltage divider R2/R5. Positive input 41 of U1-A (pin 5) and positive input 43 of U1-B (pin 11) are created by voltage divider R1/R(CB) through blocking diode D2, from PTT switches 24 and 26. R(CB) is the internal resistance of the PTT detection circuit which is a part of a conventional motorcycle CB radio, and thus external to the controller 30. Capacitor C2 functions with resistor R3 to provide switch debounce and pulse stretching. When both PTT switches 24 and 26 are open (not activated), U1's positive inputs are 1.8 volts, which is greater than negative inputs 0.97 volt reference. Due to the comparator's open collector outputs design, open circuit to ground is present at outputs 38 and 40 (pins 2 and 13 respectively). Pull-up resister R3 causes a logic 1 at U2-A input 42 (pin 1) and U2-C input 44 (pin 8). When either PTT 24 or PTT 26 is closed U1's positive inputs are 0.6 volts, which is less than negative inputs 0.97 volt reference. Due to the comparator's open collector outputs design, closed circuit to ground is now present at U1 outputs 38 and 40 (pins 2 and 13). Logic 0 will be applied to U2-A input 42 (pin 1) and U2-C input 44 (pin 8). A base biasing current is thereby provided from U1-B output 40 to transistor Q1.

U2 is a CD4093 two input NAND Schmitt Trigger quad gate. U2-A/U2-B forms a one-shot timer output to U2-C input 46 (pin 9) when initiated from U1-A output 38 (pin 2) by PTT switch closure. A pulse at U2-A output 48 (pin 3) of approximately 0.5 sec. results from RC network resister R4, capacitor C3 values and the chips Schmitt Trigger input design. If the activated PTT switch is re-opened during this 0.5 sec. window, a logic 1 would be presented to both NAND gate U2-C inputs 44 and 46 (pins 8 and 9), and the output of U2-C at 48 (pin 10) is logic 0. U2-D forms an inverter, it's output a logic 1 at 64 (pin 10) applies a clock pulse to U3 at 58 (pin 11). U3 is a CD4013 dual type D flip flop with one of the flip flop stages spared in this design and it is configured to provide a toggle at it's output. The primary connection to U3 are shown in FIG. 2 with reference numbers 50, 52, 54, 56, 58, 60 and 62 referring to pins 7, 8, 9, 10, 11, 12 and 14 respectively. Not shown, pins 1, 2 and 13 of U3 have no connection, pins 3, 5 and 6 are grounded and pin 4 is connected to the positive voltage line from diode D1. On initial energization (motorcycle ignition turn on), the combination of capacitor C4 and resister R8 provide a pulse to 52 (pin 8), causing the utilized circuit of U3 to latch it's output at 60 to logic 0. This causes the microphones to be turned on at motorcycle start up. U3 output state at 60 toggles on rising edge clock pulse at 58 from U2-D output 64. Q1 is a 2N3906 PNP transistor used as a switch. It is forward biased by a logic 0 caused by open collector ground from U1-B output 40 —OR— by U3 output 60. Diode D3 provides this OR circuit. When Q1 is forward biased it's collector current will energize both relay coils 66 and 68. D4 suppresses back emf (electro motive force) caused when the relays de-energize (drop out).

Figure 3:
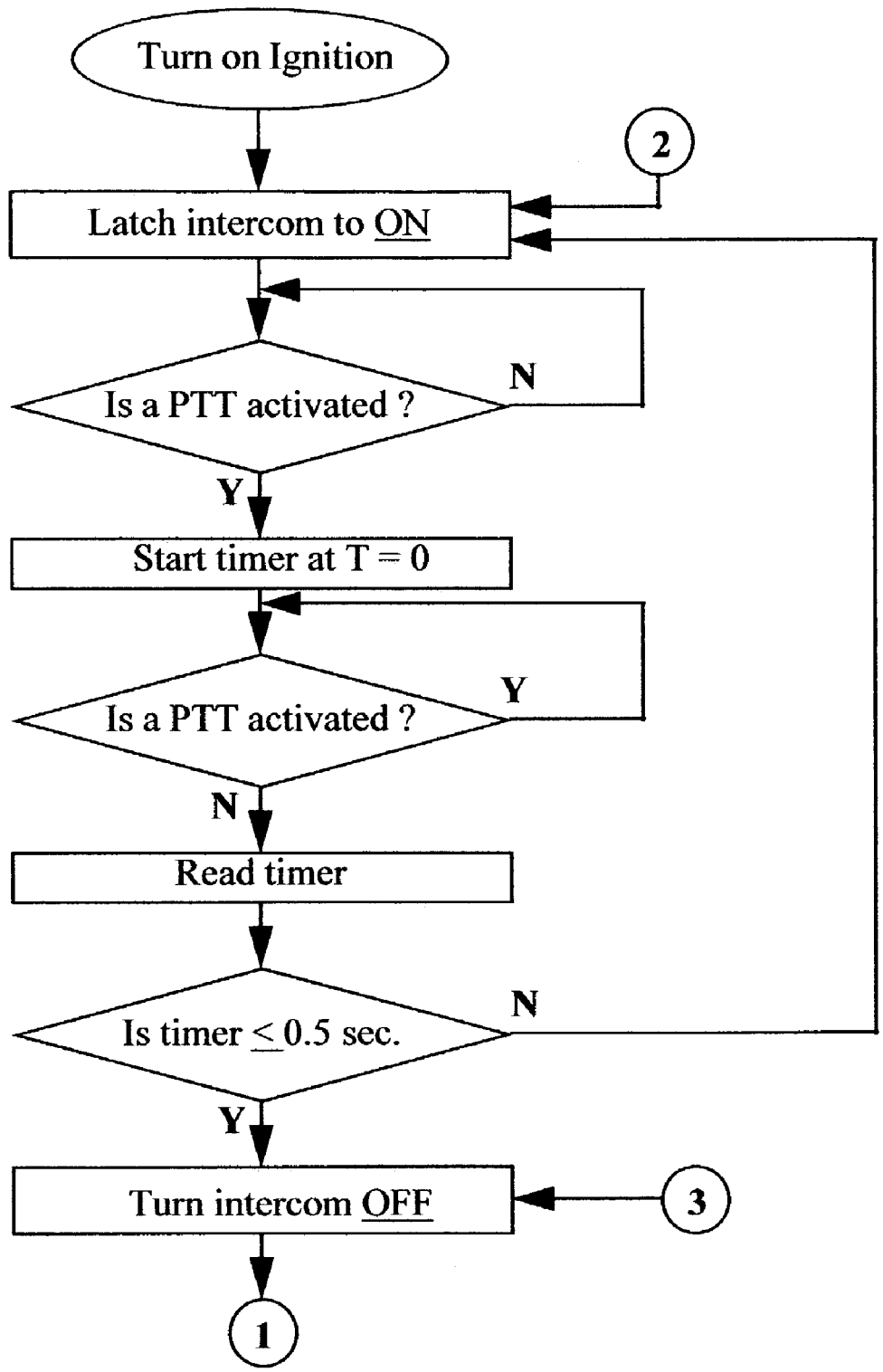
FIGS. 3–4 make up a flow chart of the logic of a second embodiment of the intercom control of the present invention.
Figure 4:
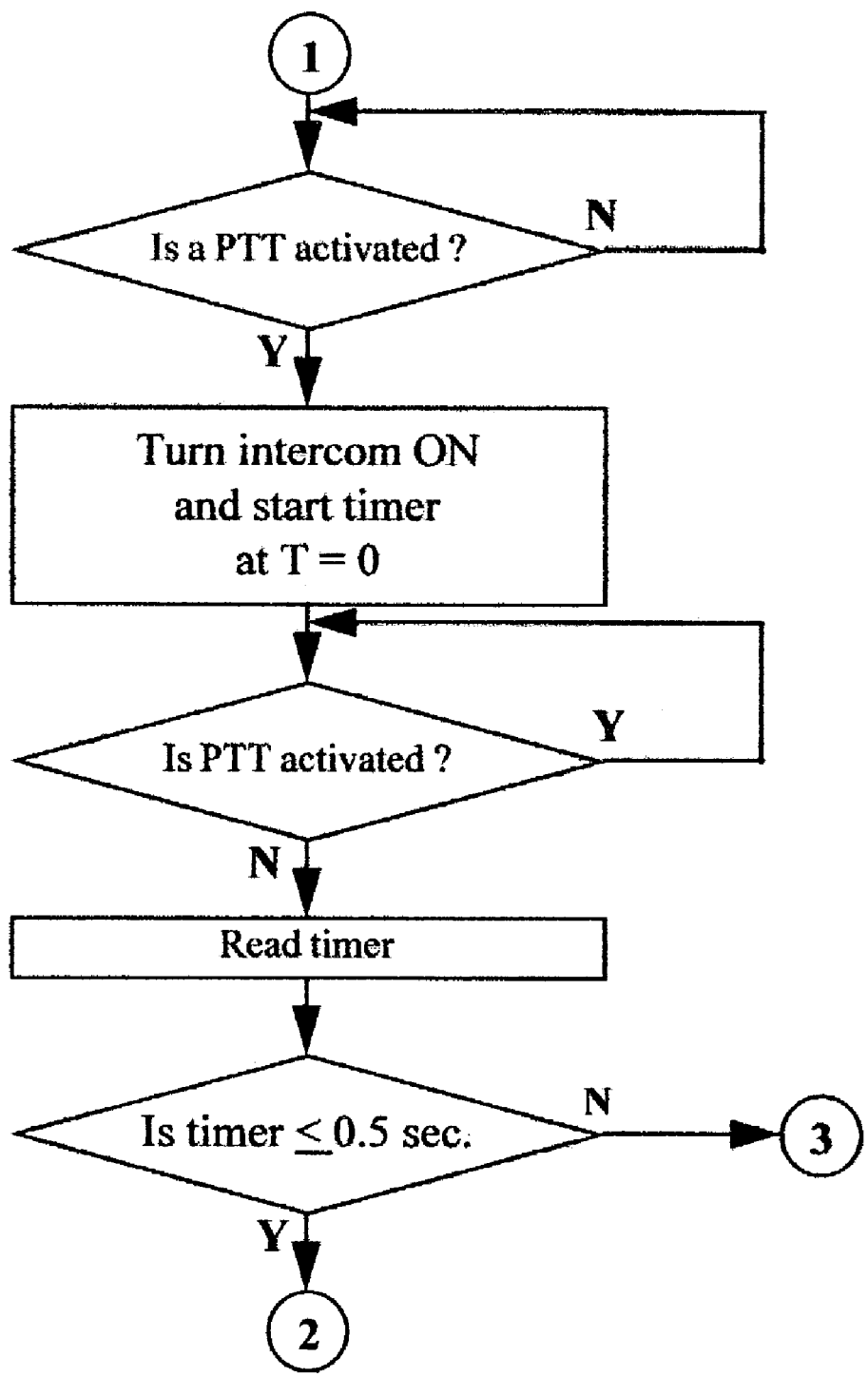

In another embodiment of my invention, the intercom controller 30 comprises a synchronous microcontroller which operates as shown in FIG. 3.

Many other changes and modifications in the embodiments of the invention can also be carried out without departing from the scope thereof.

I claim:

1. A method for controlling a communication system comprising at least one PTT and at least one microphone which has an "on" state and an "off" state and is "on" whenever the PTT is activated, said method comprising the steps of:
   detecting activation of the PTT,
   detecting deactivation of the PTT,
   determining the period of time from the detection of activation of the PTT to the detection of deactivation of the PTT, and
   permitting the microphone to remain "on" after deactivation of the PTT only if either said period of time from the activation of the PTT to the deactivation of the PTT is equal to or less than a predetermined short period of time and the microphone was "off" prior to activation of the PTT or said period of time from activation of the PTT to the deactivation of the PTT is greater than predetermined short period of time and the microphone was "on" prior to activation of the PTT.

2. The method of claim 1 wherein said predetermined short period of time is approximately 0.5 seconds.

3. The method of claim 1 wherein said predetermined short period of time is less than 0.75 seconds.

4. The method of claim 1 wherein said predetermined short period of time is a period of time less than two seconds.

5. A motorcycle communication system comprising;
   (a) at least one PTT,
   (b) at least one microphone which is activated whenever the PTT is activated,
   (c) electric circuitry adapted to detect activation and deactivation of the PTT, and
   (d) said electric circuitry being further adapted to
      (i) deactivate the microphone when the PTT is deactivated within a period of time after activation of the PTT which is equal to or less than a predetermined short period of time only if the microphone was activated prior to activation of the PTT, and
      (ii) deactivate the microphone when the PTT is deactivated within a period of time after activation of the PTT which is greater than said short period of time only if the microphone was deactivated prior to activation of the PTT.

6. A motorcycle communication system according to claim 5 wherein said predetermined short period of time is approximately 0.5 seconds.

7. A motorcycle communication system according to claim 6 wherein said electric circuitry comprises a synchronous microcontroller.

8. A motorcycle communication system according to claim 5 wherein said short period of time is less than 0.75 seconds.

9. A motorcycle communication system according to claim 8 wherein said electric circuitry comprises a synchronous microcontroller.

10. A motorcycle communication system according to claim 5 wherein said predetermined short period of time is a period of time less than two seconds.

11. A motorcycle communication system according to claim 10 wherein said electric circuitry comprises a synchronous microcontroller.

12. A motorcycle communication system according to claim 5 wherein said electric circuitry comprises a synchronous microcontroller.

13. A motorcycle communication system comprising:
    (a) at least one PTT,
    (b) at least one microphone which is activated whenever the PTT is activated.,
    (c) electric circuitry adapted to detect activation and deactivation of the PTT, and
    (d) said electric circuitry being further adapted to
        (i) deactivate the microphone when the PTT is deactivated within a period of time after activation of the PTT which is equal to or less than a predetermined short period of time only if the microphone was activated prior to activation of the PTT,
        (ii) deactivate the microphone when the PTT is deactivated within a period of time after activation of the PTT which is greater than said short period of time only if the microphone was deactivated prior to activation of the PTT,
    (e) wherein said electric circuitry comprises
        (i) a first comparator having a first input channel and a second input channel and an output channel, said first input channel of said first comparator being electrically connected to said PTT,
        (ii) a NAND Schmitt Trigger having an input channel electrically connected to said output channel of said first comparator and an output channel,
        (iii) a Flip Flop having a first input channel electrically connected to said output of said NAND Schmitt Trigger, a second input channel electrically connected to said PTT, and an output channel,
        (iv) a second comparator having a first input channel and a second input channel and an output channel, said first input channel of said second comparator being electrically connected to said PTT, and
        (v) a switch responsive to said output channel of said Flip Flop and also responsive to said output channel of said second comparator.

14. A motorcycle communication system according to claim 13 wherein said second input channel of said first comparator is electrically connected to said second input channel of said second comparator.

15. A motorcycle communication system according to claim 14 wherein said predetermined short period of time is approximately 0.5 seconds.

16. A motorcycle communication system according to claim 14 wherein said predetermined short period of time is less than 0.75 seconds.

17. A motorcycle communication system according to claim 14 wherein said predetermined short period of time is a period of time of less than two seconds.

18. A motorcycle communication system according to claim 13 wherein said predetermined short period of time is approximately 0.5 seconds.

19. A motorcycle communication system according to claim 13 wherein said predetermined short period of time is less than 0.75 seconds.

20. A motorcycle communication system according to claim 13 wherein said predetermined short period of time is a period of time less than two seconds.

* * * * *